United States Patent
Yano et al.

(10) Patent No.: US 9,499,441 B2
(45) Date of Patent: Nov. 22, 2016

(54) CUTTING TOOL MADE OF CUBIC BORON NITRIDE-BASED SINTERED MATERIAL

(75) Inventors: Masahiro Yano, Naka (JP); Tadakazu Ohashi, Mito (JP); Yosuke Miyashita, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 433 days.

(21) Appl. No.: 14/344,217

(22) PCT Filed: Sep. 12, 2012

(86) PCT No.: PCT/JP2012/073292
§ 371 (c)(1),
(2), (4) Date: Apr. 30, 2014

(87) PCT Pub. No.: WO2013/039093
PCT Pub. Date: Mar. 21, 2013

(65) Prior Publication Data
US 2015/0003926 A1    Jan. 1, 2015

(30) Foreign Application Priority Data

Sep. 12, 2011 (JP) ................................. 2011-198016
Sep. 11, 2012 (JP) ................................. 2012-199070

(51) Int. Cl.
*B23B 27/14* (2006.01)
*C04B 35/5831* (2006.01)
(Continued)

(52) U.S. Cl.
CPC ......... *C04B 35/5831* (2013.01); *B23B 27/148* (2013.01); *C04B 35/62813* (2013.01);
(Continued)

(58) Field of Classification Search
CPC ................... C04B 35/5831; C04B 2235/3217; C04B 2235/386; C04B 2235/5445;
(Continued)

(56) References Cited

U.S. PATENT DOCUMENTS 4,963,321 A * 10/1990 Saitoh ..................... C22C 1/051
419/13
6,962,751 B2 * 11/2005 Fukui .................... C04B 41/009
407/119
(Continued)

FOREIGN PATENT DOCUMENTS

GB      1593770      7/1981
JP      53-077811 A  7/1978
(Continued)

OTHER PUBLICATIONS

International Search Report mailed Oct. 9, 2012 for the corresponding PCT Application No. PCT/JP2012/073292.
(Continued)

*Primary Examiner* — Will Fridie, Jr.
(74) *Attorney, Agent, or Firm* — Leason Ellis LLP (57) ABSTRACT

A cutting tool made of cubic boron nitride-based sintered material that exhibits excellent chipping resistance and fracturing resistance in the intermittent cutting work on high hardness steel is provided. In the cutting tool, the average size of the cubic boron nitride particles is 0.5 to 8 μm. A portion of the cubic boron nitride particles are coated with aluminum oxide films having an average thickness of 10 to 90 nm on surfaces thereof, and a rift is partially formed in the aluminum oxide film. The average rift formation ratio satisfies the formula $0.02 \leq h/H \leq 0.08$, wherein h is a breadth of the rift of the aluminum oxide film and H is a girth of the particle of cubic boron nitride.

4 Claims, 6 Drawing Sheets

(51) Int. Cl.
- *C04B 35/628* (2006.01)
- *C04B 35/63* (2006.01)
- *C04B 37/02* (2006.01)
- *C22C 26/00* (2006.01)
- *B22F 5/00* (2006.01)

(52) U.S. Cl.
CPC ... *C04B 35/62889* (2013.01); *C04B 35/62897* (2013.01); *C04B 35/6303* (2013.01); *C04B 37/026* (2013.01); *C22C 26/00* (2013.01); *B22F 2005/001* (2013.01); *B23B 2226/125* (2013.01); *C04B 2235/3217* (2013.01); *C04B 2235/3804* (2013.01); *C04B 2235/386* (2013.01); *C04B 2235/3817* (2013.01); *C04B 2235/3856* (2013.01); *C04B 2235/3869* (2013.01); *C04B 2235/3886* (2013.01); *C04B 2235/402* (2013.01); *C04B 2235/5436* (2013.01); *C04B 2235/5445* (2013.01); *C04B 2237/125* (2013.01); *C04B 2237/126* (2013.01); *C04B 2237/127* (2013.01); *C04B 2237/361* (2013.01); *C04B 2237/401* (2013.01); *C22C 2026/003* (2013.01); *Y10T 407/27* (2015.01)

(58) Field of Classification Search
CPC ............... C04B 2235/402; B23B 2226/125; B23B 2226/148
See application file for complete search history.

(56) References Cited

U.S. PATENT DOCUMENTS

| | | | |
|---|---|---|---|
| 2008/0073127 A1 | 3/2008 | Zhan et al. | |
| 2013/0309468 A1* | 11/2013 | Kudo | C04B 35/583 428/216 |
| 2014/0315015 A1* | 10/2014 | Fukushima | C04B 41/87 428/336 |
| 2016/0047031 A1* | 2/2016 | Okamura | C23C 14/0641 428/216 |
| 2016/0115087 A1* | 4/2016 | Sorai | C04B 41/89 407/119 |

FOREIGN PATENT DOCUMENTS

| | | |
|---|---|---|
| JP | 58-061253 A | 4/1983 |
| JP | 05-051267 A | 3/1993 |
| JP | 08-081271 A | 3/1996 |
| JP | 08-239277 A | 9/1996 |
| JP | 2000-044347 A | 2/2000 |
| JP | 2011-183524 A | 9/2011 |
| WO | WO-2007/113643 A | 10/2007 |

OTHER PUBLICATIONS

European Search Report mailed Apr. 16, 2015 for the corresponding European Application No. 12832497.7.

Wank et al., "Nanocoating individual cohesive boron nitride particles in a fluidized bed by ALD", *Powder Technology, Elsevier Sequoia,* Lausanne, CH, Apr. 8, 2004, pp. 59-69, vol. 142, No. 1.

* cited by examiner

FIG. 5

CUTTING TOOL MADE OF CUBIC BORON NITRIDE-BASED SINTERED MATERIAL

CROSS-REFERENCE TO RELATED PATENT APPLICATIONS

This application is a U.S. National Phase Application under 35 U.S.C. §371 of International Patent Application No. PCT/JP2012/073292, filed Sep. 12, 2012, and claims the benefit of Japanese Patent Applications No. 2011-198016, filed on Sep. 12, 2011 and No. 2012-199070, filed Sep. 11, 2012, all of which are incorporated by reference in their entirety herein. The International Application was published in Japanese on Mar. 21, 2013 as International Publication No. WO/2013/039093 under PCT Article 21(2).

FIELD OF THE INVENTION

The present invention relates to a cutting tool made of cubic boron nitride (cBN)-based sintered material (hereinafter referred as cBN cutting tool) having excellent chipping resistance and fracturing resistance.

BACKGROUND OF THE INVENTION

Conventionally, the cBN cutting tool, which uses the cBN-based sintered material (hereinafter referred as cBN sintered compact) as its tool material with a low affinity to the workpiece, is known in cutting work on a ferrous workpiece such as steel, casted iron, or the like. For example, as shown in Patent Literature 1 (PTL 1), a cBN cutting tool, which contains: cBN in 20 to 80 volume % as the hard phase; and the balance of the ceramics compound such as carbides, nitrides, borides, or the like of elements belonging to 4a, 5a, 6a groups in the periodic table as the binder phase, is known. Also, as shown in Patent Literature 2 (PTL 2), a cBN cutting tool is proposed. The cutting tool body of the cBN cutting tool disclosed in PTL 2 is a sintered body whose raw material powder is coated-cBN particles coated by $Al_2O_3$ or the like on their surfaces. It is known that by using the cBN cutting tool, the abrasion resistance and toughness of the cutting tool are improved.

RELATED ART DOCUMENTS

Patent Literature

PTL 1: Japanese Unexamined Patent Application, First Publication No. S53-77811
PTL 2: Japanese Unexamined Patent Application, First Publication No. S58-61253

Problems to be Solved by the Present Invention

In the conventionally known cBN cutting tool disclosed in PTL 2, the $Al_2O_3$ film coated on the cBN particles contributes to the improvement of the toughness of the cBN cutting tool. However, in this case, the hardness of the cutting tool is reduced since $Al_2O_3$ in the binder phase in the cBN sintered compact is increased due to the thick (0.1 to 1 μm) $Al_2O_3$ film, resulting relative reduction of the cBN particle content ratio. The cBN particles are the hardness component in the cBN sintered compact. In addition, when the conventional cBN cutting tool is used in the intermittent cutting on a high-hardness steel, it reaches to the tool life in a relatively short period of time due to insufficient chipping and fracturing resistance.

Under the circumstances described above, the purpose of the present invention is to provide a cBN cutting tool that exhibits excellent chipping resistance and fracturing resistance in the intermittent cutting work on high hardness steel. In addition, the cBN cutting tool related to the present invention exhibits an excellent cutting performance for a long-term usage.

Means to Solving the Problems

In order to overcome the above-described problems, the inventors of the present invention conducted an intensive study, focusing on the cBN particles that are the hard phase component of the cBN cutting tool. Then they obtained findings described below.

In the cBN sintered compact of the conventional cBN cutting tool disclosed in PTL 2, the coated-cBN particles, which are coated by the $Al_2O_3$ film on their surfaces in advance, are used as the raw material powder. It is produce by sintering in 55 kb and at high temperature of 1000° C. or higher after forming the raw material powder, and then cooling down to the room temperature. In this conventionally known cBN cutting tool, the residual tensile stress is formed to the $Al_2O_3$ film coated on the surface of the cBN particle due to the difference of their thermal expansion characteristics.

When this conventional cBN cutting tool is applied to the intermittent cutting on high hardness steel, cracks are formed particularly on the boundaries between the cBN particle exposed on the surface of the rake face and the $Al_2O_3$ film coated on the surface due to the intermittent and impacting load during cutting and the residual tensile stress mentioned above. Then, making the cracks origins, chipping and fracturing occur.

In order to overcome the above-described problems, the inventors of the present invention conducted an intensive study and obtained findings described below.

First, the surfaces of cBN particles are coated by a thin and uniform $Al_2O_3$ film by ALD (Atomic Layer Deposition) method. ALD method is one of CVD method. It is a film deposition method in which molecules of raw material compounds are reacted on the substrate in a vacuum chamber by a layer and purges with Ar or nitrogen are repeated.

Next, the partial rifts are formed in the $Al_2O_3$ film by a ball mill or the like to produce the cBN particles that the surface of the cBN particle is exposed in the rift.

Finally, the cBN cutting tool is produced from the cBN sintered compact that are produced by sintering using the above-described cBN particle as the raw material powder under the normal sintering condition.

In the cBN cutting tool obtained by the process described above, occurrence of chipping and fracturing is suppressed even if it is used in the cutting work condition in which the intermittent and impacting load is applied, and it exhibits an excellent cutting performance for a long-term use.

In other words, the cracks in the boundaries due to the difference of thermal expansion characteristics between the surface of the cBN particle and the $Al_2O_3$ film partially coating the surface of the particle are not formed in the above-mentioned cBN cutting tool, since the surface of the cBN particle is coated by the $Al_2O_3$ film with the rift partially. Because of this, chipping and fracturing originated from the cracks are prevented.

SUMMARY OF THE INVENTION

The present invention is made based on the finding described above, and has aspects shown below.

(1) A cutting tool made of cubic boron nitride-based sintered material, the cutting tool including cubic boron nitride particles as a hard phase component, wherein an average size of the cubic boron nitride particles is 0.5 to 8 μm, a portion of the cubic boron nitride particles are coated with aluminum oxide films having an average thickness of 10 to 90 nm on surfaces thereof, and a rift is partially formed in the aluminum oxide film.

(2) The cutting tool made of cubic boron nitride-based sintered material according to (1) described above, wherein in a case of: observing an image of a cross section of the cubic boron nitride particles coated by the aluminum oxide film; and obtaining an average rift formation ratio to the aluminum oxide film formed along the surfaces of the coated cubic boron nitride particles, a formula $0.02 \leq h/H \leq 0.08$ is satisfied, wherein h is a breadth of the rift of the aluminum oxide film and H is a girth of the particle of cubic boron nitride.

(3) The cutting tool made of cubic boron-nitride based sintered material according to (1) or (2) described above, wherein in a case of obtaining a ratio of a number of the cubic boron nitride particles coated by the aluminum oxide films, which have the average thickness of 10 to 90 nm on surfaces thereof and the rift is partially formed in, a formula $(Q-q)/Q \geq 0.85$ is satisfied, wherein q is a number of cubic boron nitride particles free of the aluminum oxide film, and Q is a number of cubic boron nitride particles included in the sintered material.

Effects of the Invention

In the cBN cutting tool of an aspect of the present invention (hereinafter referred as the cBN cutting tool of the present invention), the cBN particles coated by the $Al_2O_3$ film with a rift partially are used as the raw material powder for forming the hard phase. They are mixed with the raw material powder for forming the binder phase such as the binder phase whose major component is TiN and sintered. Thus, the $Al_2O_3$ film with the partially formed rift exists between the cBN hard phase and the binder phase. As a result, not only the homogeneous tool property by the uniform distribution of the cBN hard phase in the sintered body but also improved adhesion strength between the cBN hard phase and the binder phase are obtained. Furthermore, the residual tensile stress formed in the $Al_2O_3$ film with the partially formed rift is significantly reduced compared to the one without the rift. Therefore, chipping and fracturing are suppressed in the cBN cutting tool of the present invention when it is used for the intermittent cutting work on high-hardness steel in which intermittent and impacting load is applied, and it exhibits an excellent cutting performance for a long-term use.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiments of the cBN cutting tool of the present invention are explained below.

cBN sintered compact:

Although the cBN sintered compact is made of the hard phase component and the binder phase component normally, the cBN sintered compact used for the cBN cutting tool of the present embodiment contains the cBN particles coated with the $Al_2O_3$ film with the partial rift as the hard phase component.

Also, as the other constituent components in the cBN sintered compact, the component normally included in the cBN sintered compact such as, Ti nitride, Ti carbide, Ti carbonitride, Ti boride, Al nitride, Al boride, or the like, for example, is included in the cBN sintered compact.

Average size of cBN:

The average size of the cBN particles used in the present embodiment is in the range of 0.5 to 8 μm.

When the average size of the cBN particles is less than 0.5 μm, the temperature at the cutting edge is increased in the usage of the tool, since thermal conductivity as cBN sintered compact is reduced. As a result, its hardness is reduced and the abrasion resistance is deteriorated. On the other hand, when the average size of the cBN particles exceeds 8 μm, in case of the cBN particles on the surface of the tool are fallen off during the usage of the tool, the surface roughness is increased. It causes reduced surface roughness even on the surface of the workpiece. Thus, having the average size of cBN particle more than 8 μm is also undesirable.

Because of the reasons described above, the average size of the cBN particles used in the present embodiment is set in the range of 0.5 to 0.8 μm.

When the content ratio of the cBN particles in the cBN sintered compact is less than 50 volume %, the fracturing resistance as the tool is reduced. On the other hand, when the content ratio of the cBN particles exceeds 80 volume %, the content ratio of the binder phase is reduced relatively, reducing its sinterability. Because of the reasons described above, it is preferable that the content ratio of the cBN particles in the cBN sintered compact is in the range of 50 to 80 volume %.

Production of cBN particles coated by the $Al_2O_3$ film:

The cBN particles, which are used in the present embodiment and coated by the $Al_2O_3$ film with the partial rift, can be produced by performing the processes (a) and (b) described below, for example.

(a) First, uniform and thin $Al_2O_3$ films are formed to coat the surface of the cBN particles by ALD (Atomic Layer Deposition) method, for example. By using ALD method, the $Al_2O_3$ film can be deposited on the surface of the cBN particle one layer at a time in a single-molecule level. Therefore, the uniform and thin $Al_2O_3$ film can be formed to coat without agglomeration of the cBN particles.

More specifically, for example, the cBN particles having the average size of 0.5 to 8 μm are inserted in a furnace. Then, the temperature inside of the furnace is raised to about 350° C. Then, the cycle consisting of: "Ar+Al(CH$_3$)$_3$ gas introducing process"; "1st Ar gas purge process"; "Ar+H$_2$ gas introducing process"; and "2nd Ar gas purge process" is repeated until the intended film's thickness is obtained. For example, by depositing for 5 hours, the Al$_2$O$_3$ films with thickness of 50 nm can be formed to coat the surface of the cBN particles.

By observing the cross sections of cBN particles obtained after the process (a) by SEM (Scanning Electron Microscopy), it is confirmed that the surfaces of the cBN particles are coated with uniform Al$_2$O$_3$ films without rifts.

(b) Next, by inserting the cBN particles that are produced in the above-described process (a) and coated by the uniform and thin Al$_2$O$_3$ film in a container made of cemented carbide and mixing them in a ball mill in the presence of cemented carbide balls (diameter of 1 mm) in a predetermined condition, the cBN particles coated by the Al$_2$O$_3$ films having the partial rift and the predetermined thickness can be produced.

The rift formation ratio is increased when the ratio of the cemented carbide balls to the mixed cBN particles by weight is increased. Also, when the cBN particles and the cemented carbide balls are mixed for a longer period of time, the rift formation ratio is increased.

By observing the cross sections of cBN particles obtained after the process (b) by SEM (Scanning Electron Microscopy), it is confirmed that rifts are formed in the Al$_2$O$_3$ film of the cBN particles coated by the Al$_2$O$_3$ film produced in the above-described process (a).

The reasons for producing the cBN particles coated by the uniform Al$_2$O$_3$ film without a rift first in the above-described process (a) are as follows. First, the thickness of the Al$_2$O$_3$ film can be controlled to an intended thickness in the subsequent process (b). Second, the ratio between the breadth of the rift of the Al$_2$O$_3$ film, represented by "h", and the girth of the cBN particle, represented by "H", (h/H) can be controlled to an intended value too. Third, the content ratio of cBN particles coated by the Al$_2$O$_3$ film, which has the predetermined partial rift and the predetermined thickness, $(Q-q)/Q$, can be controlled to an intended value. The content ratio of the cBN particles coated by the specific Al$_2$O$_3$ film can be obtained from the number of cBN particles not coated by the specific Al$_2$O$_3$ film, represented by "q" and the number of cBN particles included in the sintered body, represented by "Q."

Average film thickness of the Al$_2$O$_3$ film:

It is necessary to set the average film thickness of the Al$_2$O$_3$ film formed to coat the surface of the cBN particle in the present embodiment to 10 to 90 nm. On the cBN particle with the Al$_2$O$_3$ film, a rift is formed partially, and the surface of the cBN particle is exposed at the rift.

When the average thickness of the Al$_2$O$_3$ film is less than 10 nm, controlling the film thickness uniformly becomes difficult even if it is deposited by ALD method, and the crater abrasion suppressing effect is reduced. On the other hand, when the average thickness of the Al$_2$O$_3$ film exceeds 90 nm, the residual tensile stress within the Al$_2$O$_3$ film on the cBN particle in the sintered body becomes larger. Thus, cracking is likely to occur in the boundaries between the surface of the cBN particle and the Al$_2$O$_3$ film during the usage of the tool. Therefore, chipping resistance and fracturing resistance are reduced.

Accordingly, the average thickness of the Al$_2$O$_3$ films formed to coat the surfaces of the cBN particles is set to 10 to 90 nm in the present embodiment.

Partial rift formed in the Al$_2$O$_3$ film:

By coating the surfaces of the cBN particles by the Al$_2$O$_3$ films, the crater abrasion suppressing effect can be obtained. Thus, reduction of the cutting edge strength due to development of the crater abrasion can be prevented. In the present embodiment, it is necessary that the rift is formed partially in the Al$_2$O$_3$ film coated on the surfaces of the cBN particles. At the rift, the surface of the cBN particle contacts the binder phase component (for example, Ti nitride, Ti carbide, Ti carbonitride, Ti boride, Al nitride, Al boride, or the like) of the cBN sintered compact in a substantial way.

The "h" represents the breadth of the Al$_2$O$_3$ film formed along the surface of the cBN particle. The "H" represents the girth of the surface of the cBN particle When the average rift formation ratio h/H is 0, meaning there is no rift, it is in a state where the entire surface of the cBN particle is coated by an Al$_2$O$_3$ film. Therefore, the residual tensile stress is formed in the Al$_2$O$_3$ film. Therefore, cracking is likely to occur at the boundary between the cBN particle and the Al$_2$O$_3$ film by a synergistic effect of the intermittent and impacting load during cutting work and the above-described residual tensile stress. On the other hand, when the average rift formation ratio h/H exceeds 0, meaning there is a rift, the residual tensile stress formed in the Al$_2$O$_3$ film coated on the surface of the cBN particle is reduced. Thus, cracking is less likely to occur at the boundary between the cBN particle and the Al$_2$O$_3$ film even if it is used in the cutting work condition where the intermittent and impacting load is applied. As a result, occurrence of chipping and fracturing is suppressed. It is preferable that the average rift formation ratio h/H is 0.02 or more and 0.08 or less, since the crater abrasion suppressing effect and the fracture formation suppressing effect are further enhanced.

Ratio of cBN particles with the rift partially formed in the Al$_2$O$_3$ film:

The number of the cBN particles not coated by the specific Al$_2$O$_3$ film is defined as "q." The number of the cBN particles included in the sintered body is defined as "Q."

It is preferable that the ratio of cBN particles coated by the Al$_2$O$_3$ film with the partially formed rift, $(Q-q)/Q$, is 0.85 or more, meaning 85% or more of the all of cBN particles in the sintered body are coated by the specific Al$_2$O$_3$ film, in the present embodiment, since the crater abrasion suppressing effect is enhanced.

Average rift formation ratio, h/H:

In the present embodiment, the ratio between the breadth of the rift formed in the Al$_2$O$_3$ film coated on the surface of the cBN particle, represented by "h", and the girth of the surface of the cBN particle, represented by "H", can be calculated by the measurement method described below, for example.

Figure 1:
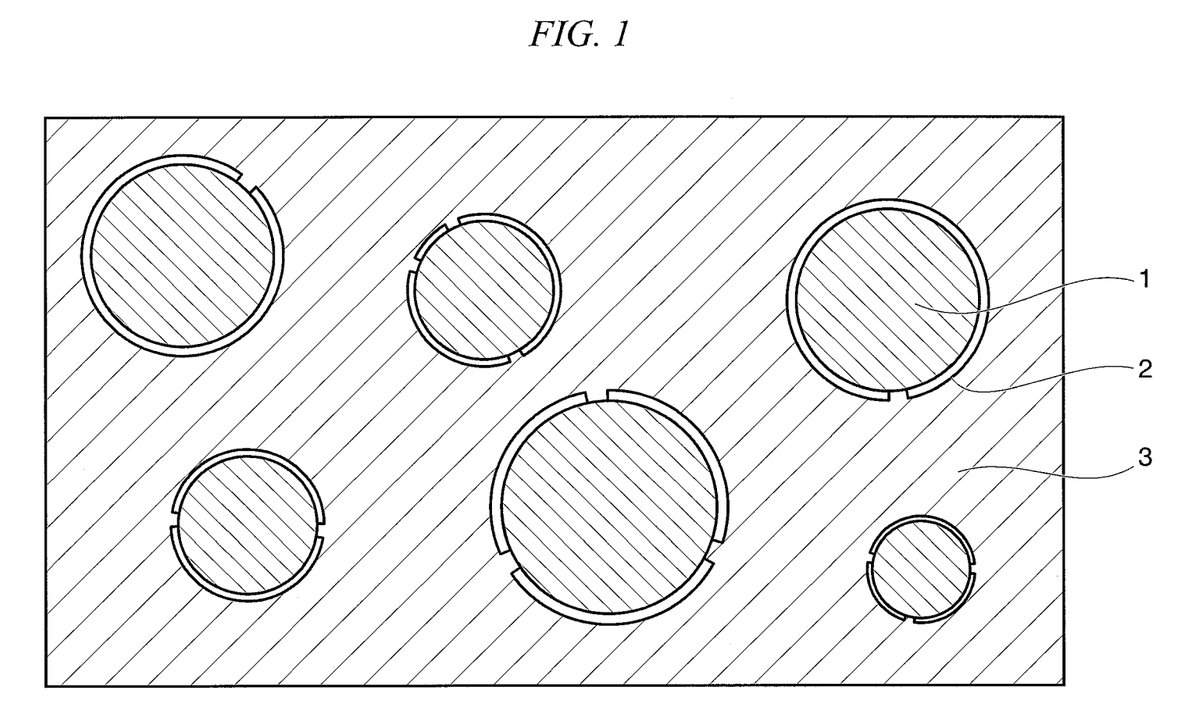
FIG. 1 is a schematic cross-sectional view of the $Al_2O_3$ film around the cBN particle of the cBN sintered compact of the present invention.

After producing the sintered body indicated by the schematic diagram shown in FIG. 1, a cross section of the sintered body is polished. Then, the cross section is further machined by FIB (Focused Iron Beam) as shown in FIG. 2A, and the multiple cross-sectional images with different depths as shown in FIG. 2B are obtained by SIM (Scanning Iron Microscopy).

Figure 2A:
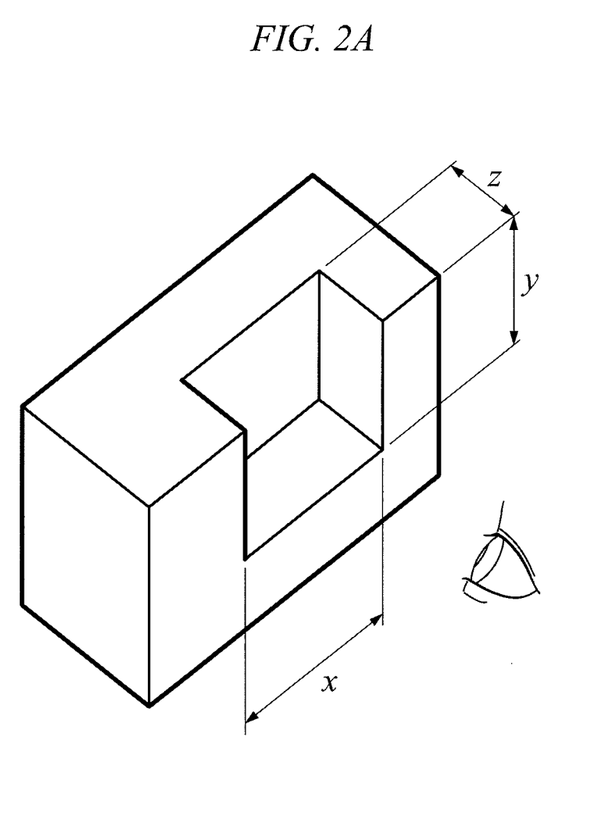
FIG. 2A is a schematic illustration of section processing by FIB and cross-section image acquisition by SIM.

FIG. 2A indicates an example of cross-sectional machining of the sintered body by FIB. SIM observation images of a part of the front of the rectangular-shaped sintered body, which correspond to the square-shaped area with the dimension of 19 μm×19 μm (vertical×width) (observation area), are obtained.

The FIB machining is performed in every 200 nm in the depth direction and the SIM images of the observation area are acquired in every depth. This is for acquiring sufficient number of data of cBN particles covering the entire particle in the depth direction in the multiple cross-sectional images in the later analysis. The total length of the cross-sectional machining (in the depth direction) is set to the value of at least 1 μm longer than the average size of the cBN particles used.

Figure 2B:
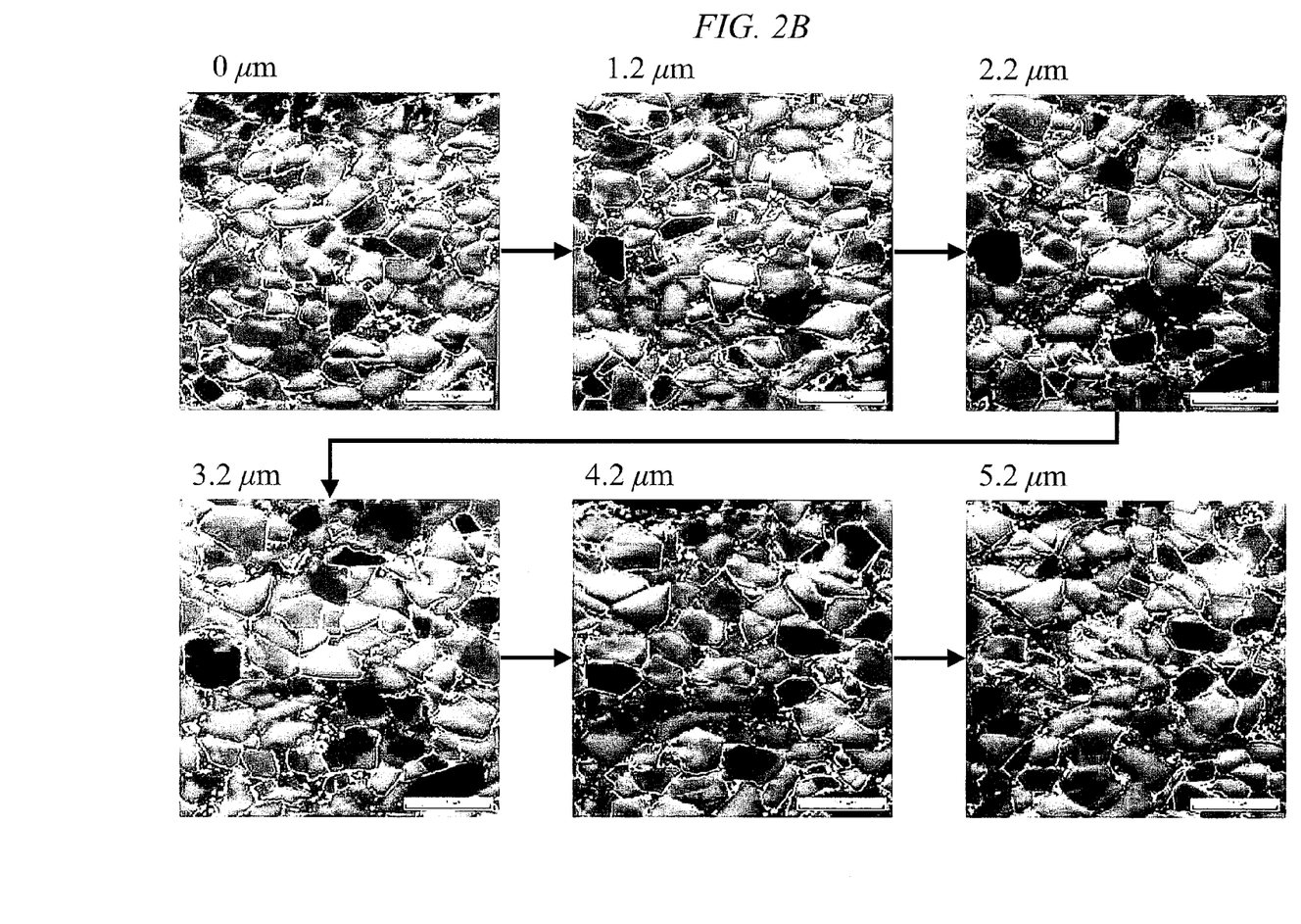
FIG. 2B shows cross-sectional images in each depth level in the section processing indicated in FIG. 2A.

FIG. 2B shows cross-sectional images in each depth in the length of the cross-sectional machining (in the depth direction) of 0 to 5.2 μm.

Among the fragmented multiple cross-sectional images obtained by the above-explained procedure, a cBN particle whose entire body is covered is selected. The "entire body is covered" means that the complete image of the cBN particle is in the observation area and the entire cBN particle is included in the multiple cross-sectional images in the depth direction. In regard to the cBN particle, the girth of the surface of the cBN particle $H_1$ and the breadth of the rift $h_1$ are measured to obtain the rift formation ratio $h_1/H_1$. Additionally, in regard to at least 10 or more of cBN particles, the rift formation ratios $h_n/H_n$ are measured. Then, from the average value of these obtained rift formation ratios, the average rift formation ratio h/H can be calculated. The case of no $Al_2O_3$ film coated on the surface of the cBN particle is excluded from the calculation.

More specifically, the procedures for measuring and calculating of the average rift formation ratio h/H are as explained below. In case of defining:

N=the number of total cBN particles measured;

n=the identification number of the measured cBN particle≤N;

M=the total number of the acquired images used in the measurement of the cBN particle n;

m=the identification number of the acquired image used in the measurement of the cBN particle n≤N;

H=the girth of the cBN particle; and h=the breadth of the $Al_2O_3$ film;

(a) first, in regard to a cross-sectional image of a cBN particle n, information related to length is measured.

Figure 3A:
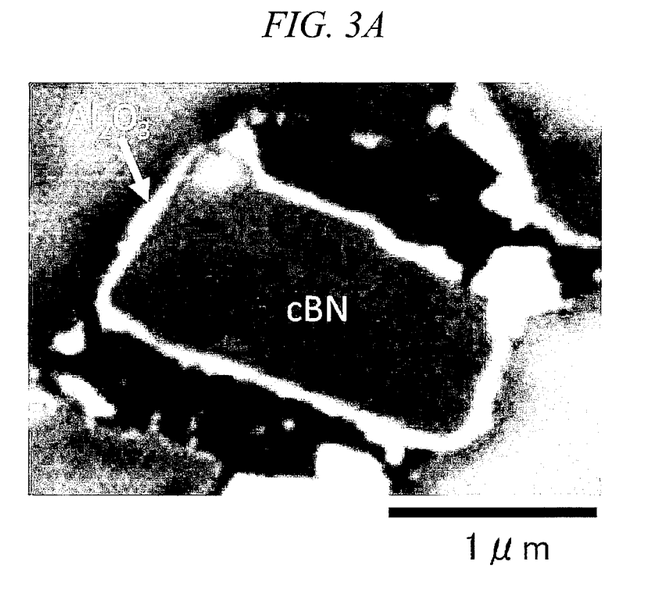
FIG. 3A shows an example of SIM cross-sectional images of the cBN particle and the $Al_2O_3$ film, which exists on the surface of the cBN particle and rifts are partially formed in, in the cBN sintered compact of the present invention.
Figure 3B:
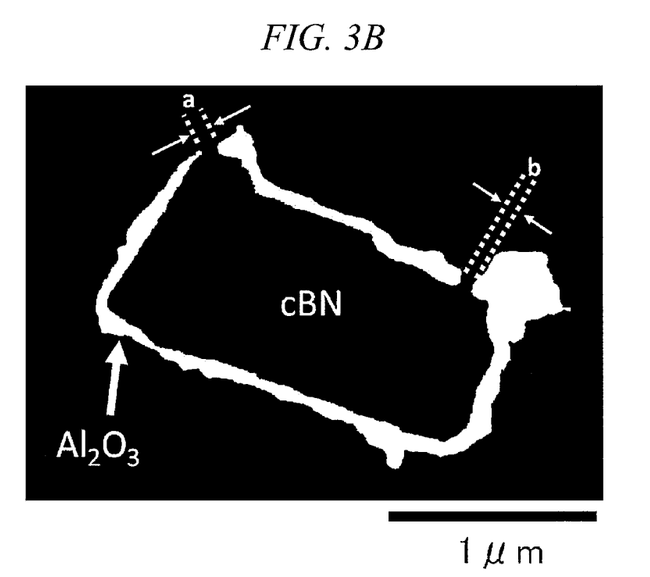
FIG. 3B shows measurement examples of the girth of the cBN particle and breadths of the rifts of the $Al_2O_3$ film based on the SIM cross-sectional image.

For example, in a case of the total number of the acquired images is 25; the cBN particle whose identification number is 1 is covered entirely from the first image to the 21th image; and the information related to length is measured in the 8th image (n=1, M=21, m=8), the girth of the cBN particle=$H_{mn}$=$H_{81}$, and the breadth of the rift of the $Al_2O_3$ film=$h_{mn}$=$h_{81}$=a+b (see FIG. 3B).

(b) Then, the rift formation ratio of a cBN particle n is calculated.

For example, in a case of: the total number of the acquired images is 25; the cBN particle whose identification number is 1 is covered entirely from the first image to the 21th image; and the rift formation ratio is calculated from these (n=1, M=21, m=1-21), the average girth of the cBN particle=$H_n$=$[(H_{1n}+H_{2n}+ \ldots +H_{mn})/M]$, and therefore $H_1=[(H_{11}+H_{21}+ \ldots +H_{211})/21]$.

Also, the average breadth of the rift $h_n=[(h_{1n}+h_{2n}+ \ldots +h_{mn})/M]$, and therefore $h_1=[(h_{11}+h_{21}+ \ldots +h_{211})/21]$.

Therefore, the rift formation ratio $h_n/H_n$ is, $h_n/H_n=h_1/H_1$.

(c) Next, the average rift formation ratio is calculated.

For example, in a case of measuring 15 cBN particles (N=15, n=1-15), the average rift formation ratio $[h/H]=[((h_1/H_1)+(h_2/H_2)+ \ldots +(h_n/H_n))/N]$.

Therefore, the average rift formation ratio [h/H] can be obtained from the formula, $[h/H]=[((h_1/H_1)+(h_2+H_2) \ldots +(h_{15}/H_{15}))/15]$ Measurement method of the content ratio of cBN particles coated by the $Al_2O_3$ films with a rift:

In the present embodiment, the content ratio of the cBN particles coated by the $Al_2O_3$ films with a rift can be calculated by the measurement method explained below, for example.

After producing the sintered body indicated by the schematic diagram shown in FIG. 1, a cross section of the sintered body is polished. Then, the cross section is further machined by FIB as shown in FIG. 2A, and the multiple cross-sectional images at different positions are obtained by SIM.

FIG. 2A indicates an example of cross-sectional machining of the sintered body by FIB. The obtained SIM observation images are a part of the front of the rectangular-shaped sintered body. In regard to the square-shaped area with the dimension of 19 μm×19 μm (vertical×width) (observation area), the SIM observation images are obtained.

The FIB machining is performed in every 200 nm in the depth direction and the SIM images of the observation area are acquired in every depth. The reason for acquiring the SIM images in regard to the observation area after the FIB machining is to exclude the effect due to smudge or the like on the sample surface before the FIB machining. When the diagonal line is drawn in the acquired SIM image, the number of the cBN particles Q contacting the diagonal line is 10 or more. Areas are observed in 5 different areas at least.

In regard to the multiple cross-sectional images at different locations obtained by the above-described procedure, diagonal lines are drawn in each cross-sectional image and the cBN particles contacting the diagonal line is selected. In each cross-sectional image, the number of the cBN particles contacting the diagonal line, $Q_1$, and the number of cBN particles without the $Al_2O_3$ film among the cBN particles contacting the diagonal line, $q_1$, are measured. In addition, in regard to other SIM images in at least 4 different locations, the content ratios of cBN particles coated by the $Al_2O_3$ film with a rift, $(Q_n-q_n)/Q_n$, are obtained. Then, from the average value of these, the content ratio of the cBN particles coated by the $Al_2O_3$ film with a rift can be calculated.

In the production of the cBN cutting tool of the present embodiment of the present invention, the cBN particles coated by the $Al_2O_3$ films with a rift partially produced by following the above-explained procedure are used as the raw material powder for the hard phase formation. Furthermore, mainly as the component constituting the binder phase (binder), for example, TiN powder is at least used as the raw material powder for the binder phase formation. Both of the raw material powders are mixed in a predetermined blend composition. Then, by sintering them under the standard ultra-high pressure and temperature condition, the cBN sintered compact of the present embodiment is produced. The surfaces of the cBN particles are coated by the $Al_2O_3$ film with the partially formed rift. At this rift, the surface of the cBN particle contacts the binder phase component (for example, Ti nitride, Ti carbide, Ti carbonitride, Ti boride, Al nitride, Al boride, or the like) of the cBN sintered compact in a substantial way. Therefore, agglomeration of each of cBN particle can be prevented. As a result, the cBN sintered compact within which cBN is evenly distributed over the entire cBN sintered compact can be produced.

As the other constituent components in the cBN sintered compact, the component normally included in the cBN sintered compact, that is at least one or more selected from the group consisting of nitride, carbide, boride, and oxide, of the element belonging to 4a, 5a, or 6a group in the periodic table, and solid solutions thereof, may be included.

FIG. 3A shows an example of SIM cross-sectional image of the cBN particle, and the $Al_2O_3$ film with the partially formed rift existing on the surface of the cBN particle in the cBN sintered compact of the present embodiment of the present invention.

Also, the relationship among [the breadth of the rift of the $Al_2O_3$ film], [the contacting length between the cBN particle and the $Al_2O_3$ film], and [the girth of cBN particle] is shown below in reference to FIG. 3B.

[the contacting length between the cBN particle and the $Al_2O_3$ film]=[the girth of cBN particle]−(a+b)

[the breadth of the rift of the $Al_2O_3$ film]=a+b

Binarization of the cross-sectional image of cBN particle:

The cross-sectional images acquired by observation of the cross sections are grey-scaled images. Therefore, each pixel contains multi-stage shading information (pixel value). In this embodiment, the cross-sectional image is 8-bit grey-scaled image and each pixel has shading information of 256 stages (0-255).

In order to measure the breadth of the rift of the $Al_2O_3$ film, it is necessary to clearly distinguish the area that the $Al_2O_3$ film is formed from the area without the $Al_2O_3$ film. Thus, it is necessary to obtain a binarized image by performing image processing to the above-mentioned grey-scaled image.

Figure 4:
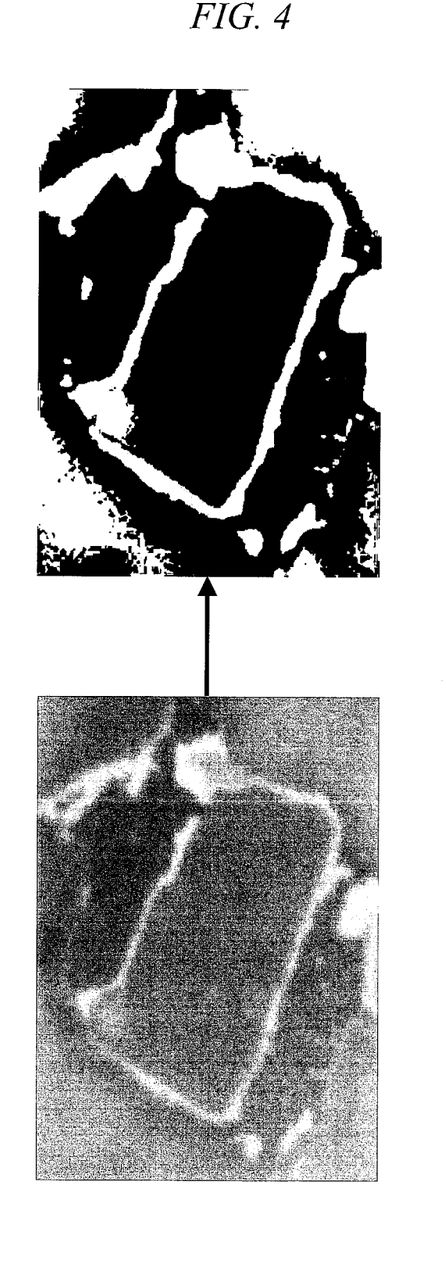
FIG. 4 shows the SIM cross-sectional images before and after the binary image processing.

FIG. 4 indicates the SIM cross-sectional images before and after the image processing for binarization.

In order to perform the image processing for binarization: the threshold value necessary for the binarization is calculated by a mathematical processing; the image processing is performed using the threshold value as the boundary value; and the $Al_2O_3$ film formed on the surface of the cBN particle is distinguished from region without the formed $Al_2O_3$ film.

The image processing for binarization is performed by following the procedure described below. First, on the outer peripheral four sides of the acquired grey-scaled image, pixels that correspond to 2% of the vertical or horizontal pixel number are removed inwardly. Then, in regard to the grey-scaled image trimmed on its outer peripheral, a histogram is produced making the pixel numbers the vertical axis and the pixel values the horizontal axis. During producing the histogram, the brightness and the contrast are adjusted to avoid the pixel values 255 or 0 from being the maximum pixel number. It is preferable that the maximum value in the histogram is in the range of 50 to 150.

Figure 5:
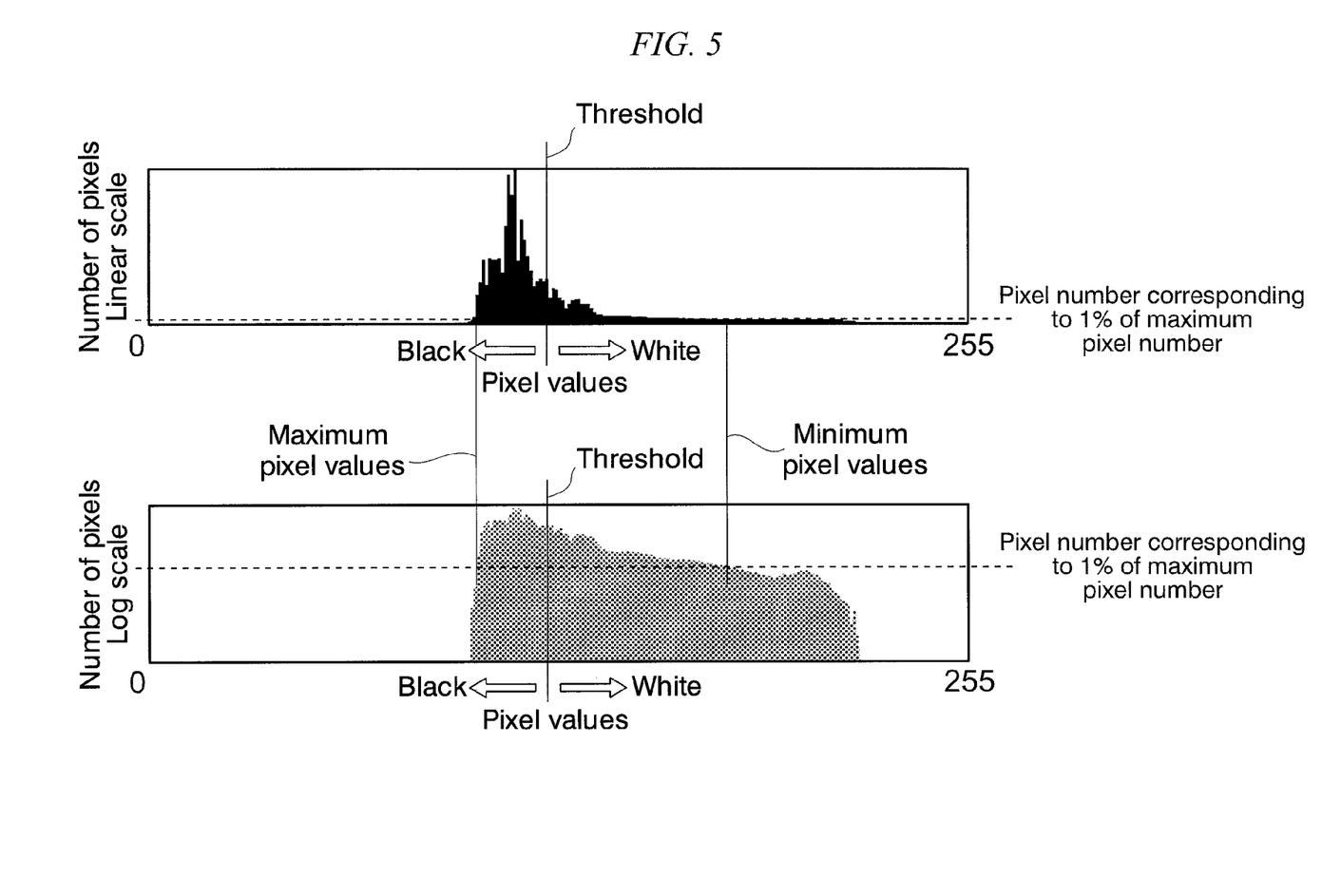
FIG. 5 shows a histogram produced for the binary image processing.

FIG. 5 shows an example of the histograms obtained by following the above-described procedure. The histograms shown above and below are the histograms produced based on the identical data. In the histogram shown above, the vertical axis of the pixel value is in the linear scale. In the histogram shown below, the vertical axis is in the logarithmic scale. The histogram in the log scale is indicated in order to make it easy to explain the after-mentioned minimum and maximum pixel values.

Next, by using the produce histogram, the maximum pixel number is determined in case of comparing among individual pixel values. That is, in regard to the above-mentioned histogram, the highest bar (the most abundant pixel number) is determined. Then, the pixel number is multiply by 0.01 to obtain the value corresponding to 1% of the maximum pixel number.

Next, by using the calculated value of 1% of the maximum pixel number as the basing point, the line parallel to the horizontal axis is drawn. In FIG. 5, the parallel line is shown by the horizontal dotted lines.

Then, the minimum and maximum pixel values are determined as the value on the intersections between the above-mentioned parallel line and the histogram. The value closer to the pixel value 0 is the minimum pixel value. The value closer to the pixel value 255 is the maximum pixel value.

Next, the difference value is obtained by subtracting the minimum pixel value from the maximum pixel value. Then, the difference value is multiplied by 0.75.

Finally, the difference value multiplied by 0.75 is subtracted from the maximum pixel value to obtain the threshold value for binarization.

In the binarizing process, the pixel having the pixel value smaller than the threshold value is converted to a black pixel. The pixel having the pixel value larger than the threshold value is converted to a white pixel.

The cBN cutting tool of the present invention is explained based on Examples below.

EXAMPLES

Production of cBN particles coated by the $Al_2O_3$ film with a rift partially:

(a) By using the cBN particles having the average size of 0.5 to 8 μm as the based material, the uniform and thin $Al_2O_3$ films were formed to coat the surfaces of the particles by ALD (Atomic Layer Deposition) method.

More specifically, for example, the cBN particles having the average size of 3 μm were inserted in a furnace. Then, the temperature inside of the furnace was raised to 350° C. Then, by introducing $Al(CH_3)_3$ and $H_2O$ gases as the gas for deposition and Ar gas as the purging gas into the furnace: (i) Ar+$Al(CH_3)_3$ gas introduction process; (ii) 1st Ar gas purge process; (iii) Ar+$H_2$ gas introducing process; and (iv) 2nd Ar gas purge process were performed.

One cycle corresponding to performing the above-mentioned processes (i) to (iv) in the order was repeated until the intended film thickness was obtained. By depositing the film for 1 to 12 hours, the $Al_2O_3$ films with each of intended film thicknesses were uniformly formed to coat on the surface of the cBN particles.

By observing the cross sections of cBN particles, which were obtained after the above-described process and coated with the $Al_2O_3$ films, by SEM (Scanning Electron Microscopy), it was confirmed that the surfaces of the cBN particles were coated with uniform and thin $Al_2O_3$ films.

(b) Next, the cBN particles, which were produced in the above-described process (a) and coated by the uniform and thin $Al_2O_3$ film on their surfaces, were inserted in a container made of cemented carbide. Then, after adding an organic solvent to the container, mixing in a ball mill was performed in the presence of cemented carbide balls (diameter of 1 mm) at the number of revolutions of the ball mill of 50 rpm. On the surfaces of the cBN particles, the $Al_2O_3$ films with the predetermined thickness and the rifts having the predetermined rift formation ratios were formed. At the rifts, the surfaces of the cBN particles were exposed. Then, the cBN particle powder containing the cBN particles, which were coated by the $Al_2O_3$ films with the predetermined rifts and film thickness, in the predetermined content ratio was prepared.

The ratio by weight between the mixed cBN particles and the cemented carbide balls was adjusted to 1:10 to 1:20. Also, the mixing time was adjusted to 0.25 to 1.5 hours.

As raw material powders, the cBN particle powder that were prepared by following the above-described procedure and coated by the $Al_2O_3$ film with the partially formed rift, the TiN powder, the Al powder, the $TiAl_3$ powder, and the $Al_2O_3$ powder were prepared. Then, these powders were blended in such a way that the content ratio of the cBN particle powder was 50 volume %. Any one of the above-mentioned TiN powder, Al powder, $TiAl_3$ powder, and $Al_2O_3$ powder had the average sizes in the range of 0.3 to 0.9 μm. They were mixed with an ultrasonic stirrer in the organic solvent. After drying them, they were press molded in the dimension of: the diameter of 50 mm; and the thickness of 1.5 mm, with a hydraulic press at the molding pressure of 120 MPa. Then, the obtained green compacts were converted to the preliminary sintered bodies by heat-treating by retaining them at 1000° C. for 30 minutes under the vacuum atmosphere of the pressure of 1 Pa or less and removing the volatile components and the adsorbate on the surfaces of the powders. Next, the obtained preliminary sintered bodies were inserted in the standard ultra-high pressure sintering apparatus in a state where each of the preliminary sintered bodies and a separately prepared supporting piece made of WC-based cemented carbide with: the composition made of 8% by mass of Co and the balance WC; and the dimension of the diameter of 50 mm and the thickness of 2 mm, were stacked together. Next, they were subjected to the ultra-high-pressure-temperature sintering in the standard condition where the pressure was 5 GPa, the temperature was 1500° C., and the retention time was 30 minutes. The disc-shaped cBN sintered materials obtained as described above were sawed in the predetermined dimension with a wire-electrical discharge machine. Then, blazing was performed on the part to be blazed (the corner part) of the insert main body, which was made of WC-based cemented carbide, with the composition made of: 5% by mass of Co; 5% by mass of TaC; and the balance WC, and the insert shape defined by the ISO standard CNGA120408, by using the Ag-based blazing material having the composition made of: 26% by mass of Cu; 5% by mass of Ti; and the balance Ag. Then, the cBN cutting tools 1 to 43 of the present invention with the insert shape defined by the ISO standard CNGA120408 were produced by performing polishing on the upper, lower, and outer peripheral surfaces and the honing treatment.

Measurement method of the average size of the cBN particles:

In regard to the cross-sectional textures of each of cBN sintered compacts obtained in the procedure described above, the secondary electron images were obtained by observing the textures of the sintered bodies with a scanning electron microscope. The parts corresponding to cBN particles within the obtained images were clipped out by an image processing, and the longest diameters of each of cBN particles were obtained by an image analysis. The longest diameters obtained as described above were regarded as the diameters [μm] of each of particles.

The volume of each cBN particles was calculated based on the diameter of each particle obtained from the above-described image analysis. The calculation was performed on the presumption that each particle was the ideal sphere (volume=$(4 \times \pi \times radius^3)/3$).

A graph was drawn by configuring for the vertical and horizontal axes to be the volume percentage [%] and the horizontal axis the diameter [μm], respectively. Then, the average particle size was obtained as the value corresponding to the value that the volume percentage was 50%.

In the preferably magnified images, about 200 particles were identified in a single image. In the present Example, the measured results were the average values obtained by processing 3 images in the method described above.

These values were shown in Table 1.

In regard to the cBN sintered compacts of the cBN cutting tools 1 to 43 of the present invention produced by following the above-described procedure, the cross sections were polished, the cross sections were machined by FIB, and the cross-sectional images were obtained by SIM. In the preferably magnified image, in case of a diagonal line was drawn on the image, 10 or more of cBN particles contacted the diagonal line. For example, when the cBN particles having the average size of 3 μm were used, 4000-fold magnification was preferable.

In order to observe the entire cBN particle, FIB machining was performed in every 200 nm. Also, the length of the cross-sectional machining (the depth direction) was set to the value of at least 1 μm longer than the average size of the used cBN particles.

From the fragmentary and multiple cross-sectional images obtained by the procedure described above, a cBN particle whose entire part was covered in the images was selected. In regard to the specific cBN particle, the girth of the cBN particle and the breadth of the rift were obtained. Additionally, in regard to the other 15 cBN particles, the girth of the cBN particles and the breadth of the rift were obtained in the same manner in order to obtain the rift formation ratios for the each of the cBN particles. Then, the average rift formation ratio h/H was calculated from the average value of the obtained rift formation ratios.

In regard to the thickness of the $Al_2O_3$ film with the partially formed rift coating the surface of the cBN particle, diagonal lines were drawn on each of cross-sectional images of the fragmentary and multiple cross-sectional images obtained as explained above, and cBN particles contacting the diagonal line were selected. Then, the thicknesses of the $Al_2O_3$ film coated on the surface of each of the contacting cBN particles were measured at least in 5 different locations in every image, and the film thicknesses on the cBN particles were obtained from the average value of the measured values. Additionally, in regard to the multiple cBN particles contacting another diagonal line, the film thicknesses of the $Al_2O_3$ films coating the surface of the cBN particles were measured in the same manner. The average film thicknesses were obtained form average values of the measured values.

In regard to the cBN sintered compacts of the cBN cutting tools 1 to 43 of the present invention produced by following the above-described procedure, the cross sections were polished, the cross sections at multiple different locations were machined by FIB, and each of the cross-sectional images were obtained by SIM. In the preferably magnified image, in case of a diagonal line was drawn on the image, 10 or more of cBN particles contacted the diagonal line. For example, when the cBN particles having the average size of 3 μm were used, 4000-fold magnification was preferable.

In regard to the content ratio of the cBN particles coated by the $Al_2O_3$ films with a rift, diagonal lines were drawn on each of cross-sectional images of the multiple cross-sectional images at different locations obtained as explained above, and cBN particles contacting the diagonal line were selected. Among the each of cross-sectional images, the number of cBN particles contacting the diagonal line, $Q_1$, and the number of the cBN particles without the specific $Al_2O_3$ films among the contacting cBN particles, $q_1$, were measured. Then, the content ratio of the cBN particles coated by the $Al_2O_3$ films with a rift, $(Q_1-q_1)/Q_1$, was obtained. Additionally, in regard to 5 of SIM images at different locations, the content ratios of the cBN particles coated by the $Al_2O_3$ films with a rift were obtained in the same manner. Then, from the average values of the obtained ratios, the content ratio of the cBN particles coated by the $Al_2O_3$ films with a rift, $(Q_1-q_1)/Q_1$, was obtained.

These values were shown in Table 1.

TABLE 1

| cBN cutting tool of the present invention | Average size of the cBN particle [μm] | Thickness of the $Al_2O_3$ film [nm] | Average rift formation ratio [h/H] | Content ratio (Q-q)/Q |
|---|---|---|---|---|
| 1 | 1.4 | 10 | 0.14 | 0.89 |
| 2 | 8.0 | 50 | 0.06 | 0.85 |
| 3 | 0.5 | 45 | 0.04 | 0.85 |
| 4 | 0.5 | 43 | 0.16 | 0.86 |
| 5 | 3.1 | 12 | 0.21 | 0.84 |
| 6 | 3.0 | 11 | 0.06 | 0.90 |
| 7 | 2.7 | 52 | 0.02 | 0.92 |
| 8 | 0.5 | 45 | 0.02 | 0.80 |
| 9 | 3.1 | 10 | 0.01 | 0.70 |
| 10 | 5.3 | 90 | 0.21 | 0.71 |
| 11 | 5.8 | 48 | 0.08 | 0.86 |
| 12 | 3.1 | 51 | 0.05 | 0.89 |
| 13 | 1.6 | 11 | 0.08 | 0.86 |
| 14 | 5.7 | 51 | 0.04 | 1.00 |
| 15 | 2.6 | 88 | 0.05 | 1.00 |
| 16 | 3.3 | 48 | 0.18 | 0.88 |
| 17 | 2.8 | 90 | 0.02 | 0.85 |
| 18 | 3.3 | 90 | 0.20 | 0.87 |
| 19 | 5.8 | 10 | 0.02 | 0.95 |
| 20 | 3.1 | 90 | 0.08 | 0.85 |
| 21 | 6.1 | 53 | 0.17 | 0.89 |
| 22 | 1.7 | 10 | 0.05 | 0.93 |
| 23 | 8.0 | 51 | 0.15 | 0.85 |
| 24 | 6.1 | 47 | 0.02 | 0.97 |
| 25 | 5.5 | 87 | 0.02 | 0.90 |
| 26 | 5.9 | 48 | 0.01 | 0.86 |
| 27 | 1.3 | 10 | 0.02 | 0.96 |
| 28 | 2.8 | 10 | 0.08 | 0.85 |
| 29 | 3.0 | 51 | 0.01 | 0.91 |
| 30 | 3.2 | 52 | 0.08 | 0.76 |
| 31 | 2.9 | 10 | 0.17 | 0.72 |
| 32 | 8.0 | 48 | 0.08 | 0.69 |
| 33 | 2.9 | 50 | 0.08 | 0.89 |
| 34 | 7.8 | 53 | 0.13 | 0.87 |
| 35 | 3.2 | 10 | 0.01 | 0.97 |
| 36 | 0.5 | 48 | 0.07 | 0.90 |
| 37 | 7.9 | 52 | 0.08 | 0.87 |
| 38 | 2.9 | 53 | 0.12 | 0.90 |
| 39 | 0.6 | 47 | 0.10 | 0.88 |
| 40 | 2.9 | 13 | 0.02 | 1.00 |
| 41 | 1.4 | 46 | 0.14 | 0.86 |
| 42 | 2.8 | 10 | 0.08 | 0.71 |
| 43 | 1.8 | 90 | 0.16 | 0.82 |

For comparison, the cBN particle powder without the $Al_2O_3$ film formed to coat the surface of the particle was prepared as the raw material powder. Also, the cBN particle powder, in which the cBN particle was coated with an $Al_2O_3$ film without the rift and with the average thickness out of the range defined in the scope of the present invention, was prepared. Also, the cBN particle powder, in which the cBN particle was coated with an $Al_2O_3$ film with the rift and the average thickness out of the range defined in the scope of the present invention, was prepared. Also, the cBN particle powder, in which the average size of the cBN particles was out of the range defined in the scope of the present invention and the cBN particle was coated with the $Al_2O_3$ film without the rift, was prepared. Also, the cBN particle powder, in which the $Al_2O_3$ film with a rift was coated on the surface of the cBN particles with the averages size out of the range defined in the scope of the present invention, was prepared.

In regard to the rift formation to the cBN particles coated by the $Al_2O_3$ films with the average thickness out of the range defined in the scope of the present invention, when the average thickness was less than 10 nm, the ratio of the mixed cBN particles and the balls made of cemented carbide was adjusted to be 1:10 to 1:20, and the mixing time was adjusted to be 0.08 to 0.15 hours. When the average thickness exceeded 90 nm, the ratio of the mixed cBN particles and the balls made of cemented carbide was adjusted to be 1:20 to 1:40, and the mixing time was adjusted to be 48 hours at most. Also, in regard to the rift formation to the $Al_2O_3$ films, which coated on the cBN particles with the average size out of the range defined in the scope of the present invention and had the thickness within the range of 10 nm to 90 nm, the same condition as in the case of the present invention was applied. Also, the TiN powder, the Al powder, the $TiAl_3$ powder, and $Al_2O_3$ powder with the average sizes of 0.3 to 0.9 μm were prepared. The above-mentioned raw material powders were blended in such a way that the content ratio of the cBN particle powder was 50 volume %. After that, by performing the same treatment operations (mixing, drying, molding, heat-treating, preliminary sintering, sintering, or the like) as in the case of the present invention, the comparative cBN cutting tools 44 to 73 were produced.

In regard to the comparative Examples 44 to 73 produced by following the above-described procedure, the average sizes of the cBN particles were obtained in the same manner as in the cBN cutting tools 1 to 43 of the present invention.

These values were shown in Table 2.

In regard to the comparative cBN cutting tools 44 to 73 produced by following the procedure described above: the average size of the cBN particles; the average rift formation ratio h/H; the average thickness of the $Al_2O_3$ film; and the content ratio of the cBN particles coated by the $Al_2O_3$ film with a rift were obtained in the same manner as in the cBN cutting tools 1 to 43 of the present invention.

These values were shown in Table 2.

TABLE 2

| Comparative cBN cutting tool | Average size of the cBN particle [μm] | Thickness of the $Al_2O_3$ film [nm] | Average rift formation ratio [h/H] | Content ratio (Q-q)/Q |
|---|---|---|---|---|
| 44 | 0.5 | 6 | 0.17 | 0.85 |
| 45 | 1.4 | 10 | No rift | 1.00 |
| 46 | 0.5 | 211 | 0.02 | 0.91 |
| 47 | 3.2 | 13 | No rift | 1.00 |
| 48 | 2.9 | 0 | No rift | 0.00 |
| 49 | 2.7 | 4 | 0.06 | 0.90 |
| 50 | 3.3 | 6 | 0.15 | 0.85 |
| 51 | 2.9 | 49 | No rift | 1.00 |
| 52 | 3.1 | 90 | No rift | 1.00 |
| 53 | 3.2 | 197 | 0.05 | 0.89 |
| 54 | 2.8 | 216 | No rift | 1.00 |
| 55 | 6.2 | 5 | 0.02 | 0.92 |
| 56 | 1.8 | 3 | 0.17 | 0.69 |
| 57 | 5.8 | 47 | No rift | 1.00 |
| 58 | 6.0 | 190 | 0.02 | 0.91 |
| 59 | 10.4 | 10 | 0.06 | 0.85 |
| 60 | 3.4 | 5 | 0.23 | 0.72 |
| 61 | 10.2 | 49 | No rift | 1.00 |
| 62 | 4.6 | 174 | 0.08 | 0.78 |
| 63 | 9.8 | 53 | 0.05 | 0.91 |
| 64 | 7.9 | 89 | No rift | 1.00 |
| 65 | 7.6 | 132 | 0.01 | 0.81 |
| 66 | 10.3 | 46 | 0.16 | 0.90 |
| 67 | 9.7 | 90 | 0.05 | 0.91 |
| 68 | 2.7 | 220 | 0.19 | 0.77 |
| 69 | 9.2 | 0 | No rift | 0.00 |
| 70 | 2.8 | 6 | 0.21 | 0.87 |

TABLE 2-continued

| Comparative cBN cutting tool | Average size of the cBN particle [μm] | Thickness of the Al$_2$O$_3$ film [nm] | Average rift formation ratio [h/H] | Content ratio (Q-q)/Q |
|---|---|---|---|---|
| 71 | 2.8 | 160 | 0.18 | 0.83 |
| 72 | 8.1 | 120 | 0.01 | 0.92 |
| 73 | 2.9 | 154 | 0.01 | 0.91 |

In regard to the cBN cutting tools 1 to 43 of the present invention and the comparative cBN cutting tools 44 to 73, the cutting machining tests were performed to the cutting length of 7000 m at most in the cutting condition shown in Table 3

The results of the cutting machining tests were shown in Table 4.

TABLE 3

| Cutting conditions | Workpiece | SCr420 (HRC58-62) |
|---|---|---|
| | | End face machining, 4 slits (slits were formed every 90° at the end face) |
| | Cutting rate | 150 m/min |
| | Feed rate | 0.1 mm/rev |
| | Cutting depth | 0.2 mm |
| | Condition | Dry |
| | Evaluation criteria | Occurrence of fracturing and chipping was checked in every 100 m until reaching to the machining length of 7000 m |

TABLE 4

| | | State of cutting edge Machining to 7000 m at most |
|---|---|---|
| cBN cutting tool of the present invention | 1 | Chipping at 5800 m |
| | 2 | Chipping at 6700 m |
| | 3 | No fracturing and chipping |
| | 4 | Chipping at 5600 m |
| | 5 | Chipping at 5500 m |
| | 6 | Chipping at 6700 m |
| | 7 | Chipping at 6800 m |
| | 8 | Chipping at 5800 m |
| | 9 | Chipping at 5000 m |
| | 10 | Chipping at 5400 m |
| | 11 | Chipping at 6900 m |
| | 12 | No fracturing and chipping |
| | 13 | Chipping at 6500 m |
| | 14 | No fracturing and chipping |
| | 15 | Chipping at 6800 m |
| | 16 | Chipping at 5900 m |
| | 17 | Chipping at 6300 m |
| | 18 | Chipping at 5500 m |
| | 19 | Chipping at 6300 m |
| | 20 | Chipping at 6700 m |
| | 21 | Chipping at 5800 m |
| | 22 | Chipping at 6500 m |
| | 23 | Chipping at 5200 m |
| | 24 | Chipping at 6700 m |
| | 25 | Chipping at 6200 m |
| | 26 | Chipping at 5600 m |
| | 27 | Chipping at 6200 m |
| | 28 | Chipping at 6700 m |
| | 29 | Chipping at 5800 m |
| | 30 | Chipping at 6100 m |
| | 31 | Chipping at 5400 m |
| | 32 | Chipping at 5400 m |
| | 33 | No fracturing and chipping |
| | 34 | Chipping at 5900 m |
| | 35 | Chipping at 5600 m |
| | 36 | Chipping at 6800 m |
| | 37 | Chipping at 6700 m |
| | 38 | Chipping at 6600 m |
| | 39 | Chipping at 6500 m |
| | 40 | Chipping at 6500 m |
| | 41 | Chipping at 6200 m |
| | 42 | Chipping at 5600 m |
| | 43 | Chipping at 5500 m |
| Comparative cBN cutting tool | 44 | Chipping at 3200 m |
| | 45 | Chipping at 3900 m |
| | 46 | Fracturing at 2800 m |
| | 47 | Chipping at 4000 m |
| | 48 | Chipping at 2500 m |
| | 49 | Fracturing at 3800 m |
| | 50 | Chipping at 3400 m |
| | 51 | Chipping at 4200 m |
| | 52 | Chipping at 3800 m |
| | 53 | Fracturing at 3400 m |
| | 54 | Fracturing at 2600 m |
| | 55 | Fracturing at 3600 m |
| | 56 | Chipping at 2900 m |
| | 57 | Chipping at 3800 m |
| | 58 | Fracturing at 3200 m |
| | 59 | Fracturing at 3000 m |
| | 60 | Fracturing at 2800 m |
| | 61 | Chipping at 2700 m |
| | 62 | Fracturing at 3000 m |
| | 63 | Fracturing at 3300 m |
| | 64 | Fracturing at 3500 m |
| | 65 | Chipping at 2700 m |
| | 66 | Fracturing at 3000 m |
| | 67 | Chipping at 3100 m |
| | 68 | Fracturing at 2800 m |
| | 69 | Chipping at 2400 m |
| | 70 | Chipping at 3200 m |
| | 71 | Fracturing at 3100 m |
| | 72 | Chipping at 2800 m |
| | 73 | Fracturing at 2900 m |

The results indicated in Tables 1 to 4 demonstrate following. In the cBN cutting tools 1 to 43 of the present invention, the Al$_2$O$_3$ films with the partially formed rifts were formed to coat the surface of the cBN particles. Because of this, the cBN hard phase is uniformly distributed in the sintered bodies. In this case, not only are the uniform tool characteristics obtained but also the adhesion strength at the boundary between the cBN hard phase and the binder phase is improved. Furthermore, the residual tensile stress formed in the Al$_2$O$_3$ film with the partially formed rift is significantly reduced compared to one without the rift. Therefore, occurrence of chipping and fracturing is suppressed even if it is used in the intermittent cutting work on a high hardness steel where the intermittent and impacting load is applied, and the cBN cutting tool of the present invention exhibits an excellent cutting performance for a long-term use.

Contrary to that, in the comparative cBN cutting tools 44 to 73, because the Al$_2$O$_3$ films were not formed on the cBN particles, the average thickness of the Al$_2$O$_3$ film was out of the range defined in the scope of the present invention, or the average rift formation ratio was out of the range define in the scope of the present invention, the chipping resistance and the fracturing resistance were poor, and the service life of the tools was short.

INDUSTRIAL APPLICABILITY

As explained above, the cBN cutting tool related to the present invention can be applied not only to the intermittent cutting condition on high hardness steel but also to other cutting conditions. Therefore, it can be applied to a high-performance cutting equipment. In addition, it can be applied for labor-saving, energy-saving, and cost reduction in cutting work.

BRIEF DESCRIPTION OF THE REFERENCE SYMBOLS

1: cBN grain
2: $Al_2O_3$ film
3: Bonding phase

The invention claimed is:

1. A cutting tool made of cubic boron nitride-based sintered material, comprising:
   cubic boron nitride particles as a hard phase component, wherein
   an average size of the cubic boron nitride particles is in a range of 0.5 to 8 μm,
   a portion of each of the cubic boron nitride particles is coated with aluminum oxide film having an average thickness of 10 to 90 nm on surfaces thereof, and
   a rift is partially formed in the aluminum oxide film.

2. The cutting tool made of cubic boron nitride-based sintered material according to claim 1, wherein in a case of:
   observing an image of a cross section of the cubic boron nitride particles coated by the aluminum oxide film; and
   obtaining an average rift formation ratio to the aluminum oxide film formed along the surfaces of the coated cubic boron nitride particles,
   a formula $0.02 \leq h/H \leq 0.08$ is satisfied, where
   h is a breadth of the rift of the aluminum oxide film and H is a girth of the particle of cubic boron nitride.

3. The cutting tool made of cubic boron-nitride based sintered material according to claim 1, wherein in a case of obtaining a ratio of a number of the cubic boron nitride particles coated by the aluminum oxide film, which have the average thickness of 10 to 90 nm on surfaces thereof and the rift is partially formed in, a formula $(Q-q)/Q \geq 0.85$ is satisfied, where
   q is a number of cubic boron nitride particles free of the aluminum oxide film, and Q is a number of cubic boron nitride particles included in the sintered material.

4. The cutting tool made of cubic boron-nitride based sintered material according to claim 2, wherein in a case of obtaining a ratio of a number of the cubic boron nitride particles coated by the aluminum oxide film, which have the average thickness of 10 to 90 nm on surfaces thereof and the rift is partially formed in, a formula $(Q-q)/Q \geq 0.85$ is satisfied, where
   q is a number of cubic boron nitride particles free of the aluminum oxide film, and Q is a number of cubic boron nitride particles included in the sintered material.

* * * * *